Feb. 8, 1966  L. A. PFAFF  3,233,910
WELDING WORK CENTERING CHUCK
Filed May 14, 1963  3 Sheets-Sheet 2
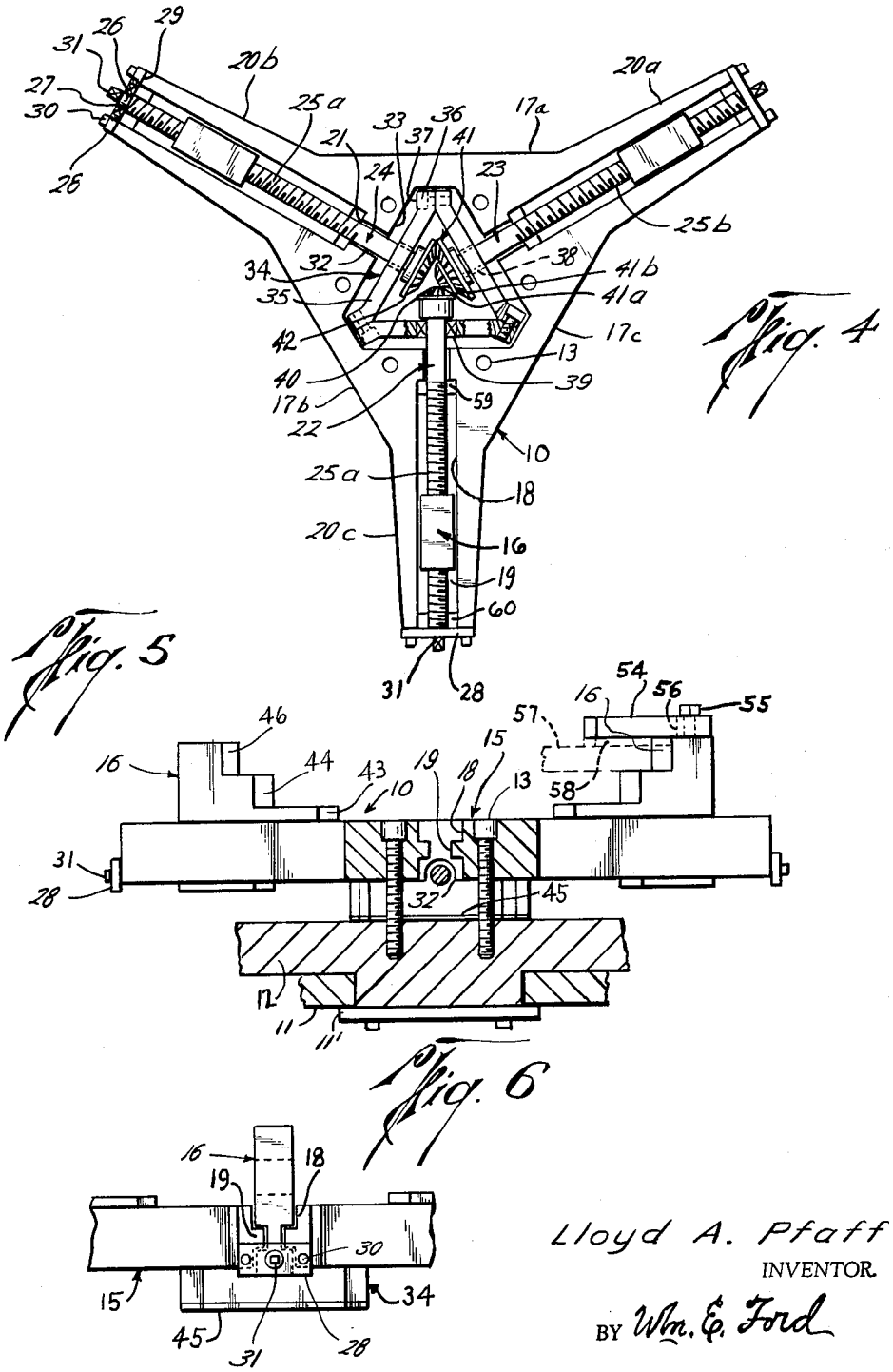
Lloyd A. Pfaff
INVENTOR.
BY Wm. E. Ford
ATTORNEY Feb. 8, 1966 L. A. PFAFF 3,233,910
WELDING WORK CENTERING CHUCK
Filed May 14, 1963 3 Sheets-Sheet 3
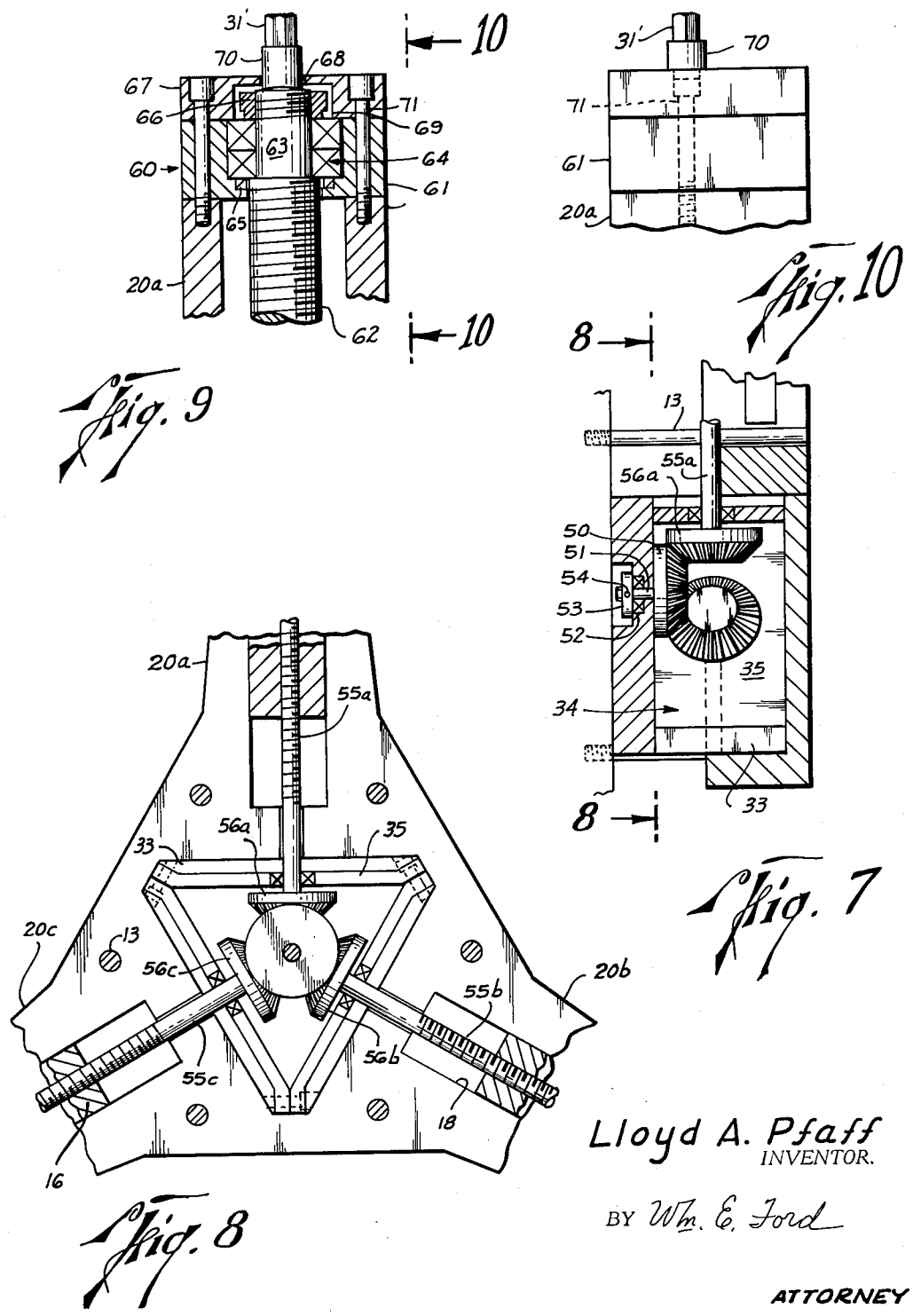
Lloyd A. Pfaff
INVENTOR.
BY Wm. E. Ford
ATTORNEY United States Patent Office 3,233,910
Patented Feb. 8, 1966

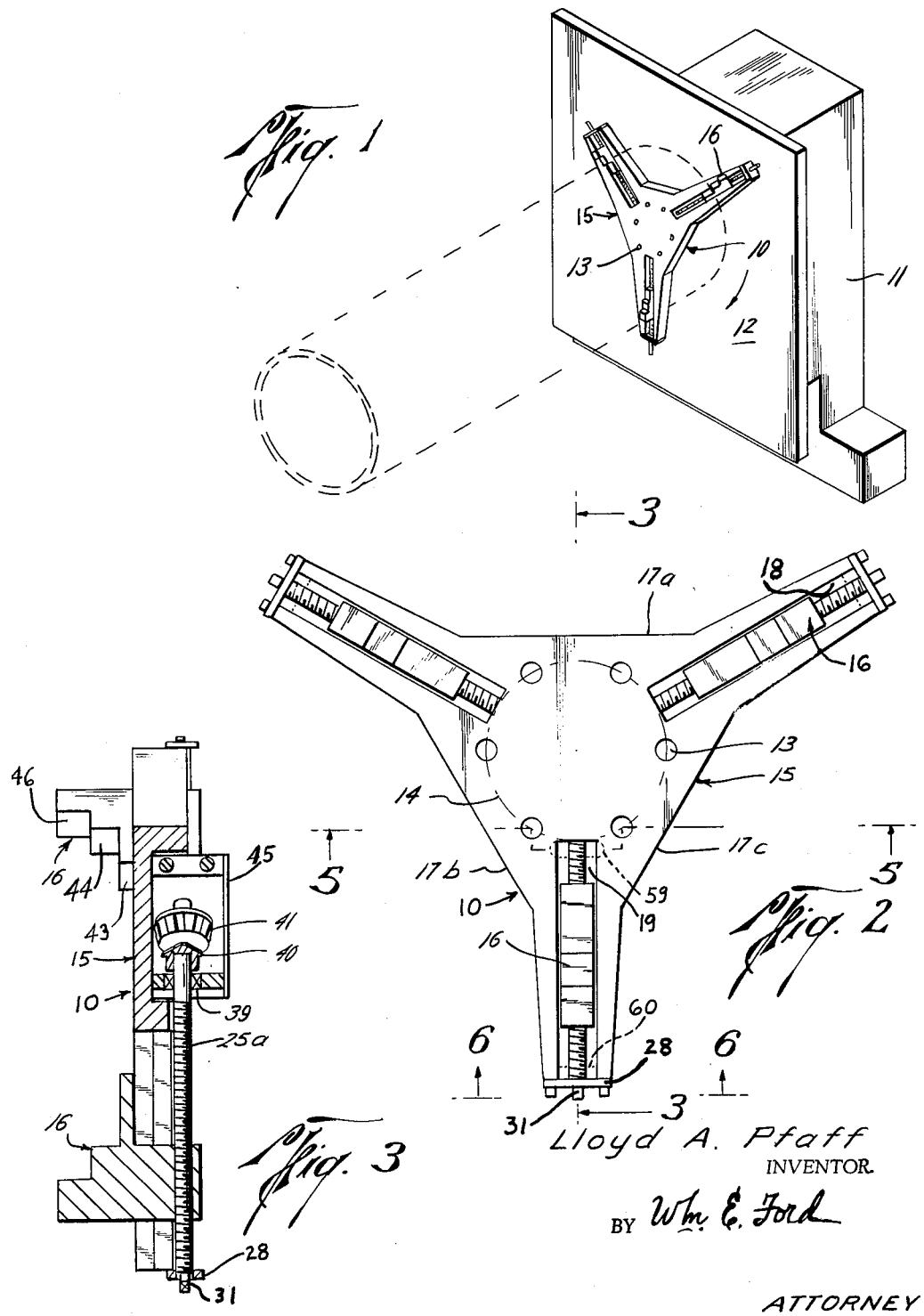

3,233,910
WELDING WORK CENTERING CHUCK
Lloyd A. Pfaff, 3907 Galway Lane, Houston 55, Tex.
Filed May 14, 1963, Ser. No. 280,466
5 Claims. (Cl. 279—112)

This invention relates to a chuck, as to a welding work centering chuck, having three jaws which are conjointly adjustable to move inwardly or outwardly together regardless of which of the respective jaw adjusting shafts may be rotated; this application adding features as a continuation-in-part application of co-pending application, Serial No. 264,483, filed March 8, 1963, for Welding Work Centering Chuck, now abandoned.

As a primary object the invention provides a chuck of this class having three conjointly adjustable jaws whereby rotation of the shaft of any jaw moves all three jaws at equal rate inwardly or outwardly, dependent upon the direction of rotation.

It is also an object of this invention to provide a chuck of this class which may be positioned on various rotated backing means or chuck supports, it only being required that such supports are threaded to accommodate a minimum of necessary mounting bolts or machine screws carried by the chuck.

It is also an object of this invention to provide a chuck of this class which may have two part jaws universally adjustably connected to accommodate work of irregular cross-section.

It is also another object of the invention to provide a chuck of this class which automatically latches itself by means inherent in its construction whereby it may retain any of the infinite positions to which the chuck jaws may be moved to hold work to be welded.

It is yet another object of this invention to provide a chuck having three conjointly infinitesimally adjustable jaws which can firmly hold work within any tubular or cylindrical sizes whereby the work is firmly grasped against chuck jaw movement while fabrication is accomplished, as by welding while the work, chuck, and the chuck support for the chuck are rotated.

It is also a further object of this invention to provide a chuck of this class adapted to hold work supported thereby against axial displacement.

It is a further object of this invention to provide a chuck of this class including anti-friction units installed on the outer ends of the arms to receive and center the outer ends of the transmission shafts therethrough while such units also serve as slot end closure means.

It is still another and further object of this invention to provide such anti-friction slot end closure journals which are accessible for service and exchange.

Other and further objects will be apparent when the specification herein is considered in connection with the drawings in which:

FIG. 1 is an isometric view of a chuck and mount therefor, the chuck comprising the invention being shown grasping work to be welded, and in this case comprising tubular goods shown in dotted lines;

FIG. 2 is a front elevational view of the chuck shown isometrically in FIG. 1;

FIG. 3 is a transverse elevational view, part in section, taken along line 3—3 of FIG. 2, the section passing through the lower arm of the chuck as it extends with axis in the vertical, while an angularly upwardly extending arm is apparent in side elevational projection;

FIG. 4 is a rear elevational view of the chuck shown in front elevation in FIG. 2, the cover plate of the gear box being removed;

FIG. 5 is a view looking upwardly and shown part in section, taken along line 5—5 of FIG. 4, the view including a fragmentary section through the mount for the chuck, also the rearwardly extending under part of the gear box being visible in this view;

FIG. 6 is a fragmentary bottom view, taken along line 6—6 of FIG. 2;

FIG. 7 is a sectional view showing a modification of the transmission shown in FIGS. 1–6 included;

FIG. 8 is a rear elevational view taken along line 8—8 of FIG. 7;

FIG. 9 is a sectional elevation showing a modification of the means of closing the slots of the arms shown in FIGS. 1–6 included; and FIG. 10 is a side elevational view taken along line 10—10 of FIG. 9.

Referring now in detail to the drawings in which like reference numerals are assigned to like elements in the various views, a chuck 10 is best disclosed in FIGS. 1 and 5 mounted upon a base plate 12 having a rearwardly extending, round or cylindrical boss or projection 12′ which is journalled in a support bracket 11, as shown in FIG. 5. A collar 11′ is shown bolted to the rear face of the projection 12′ to rotate therewith and to prevent axial displacement of the work and chucking assembly during rotation.

The chuck 10 is mounted upon the base plate 12 by means of hollow headed bolts 13 on a bolt circle 14, as shown in FIG. 2, the heads of the bolts having non-circular recesses therein, and the shanks of the bolts being threaded and passing through bores in the body 15 of the chuck, and through bores through a spacer plate, shim or gasket 45 and being threaded into threaded bores in the base plate 12. A gear box 34, to be hereinbelow described, extends rearwardly from the body 15 to bear upon the forward face of the spacer plate 45 when the bolts 13 are threaded into the base plate.

The chuck body 15 has triangular sides 17a, 17b and 17c, and arms 20a, 20b and 20c extend radially outwardly, respectively, from the sides 17a, 17c from the sides 17a, 17b, and from the sides 17b, 17c. Each arm has a slot 18 therein extending through the body 15 and longitudinally outwardly to the end of the arm. Chuck jaws 16 move in slots 18 radially inwardly and outwardly from the center of the body 15 which center is also the center of the bolt circle 14 and the center of a circle, not shown, but which is circumscribed by the sides 17a, 17b and 17c of the body 15.

The slots 18, as best seen in FIGS. 5 and 6, are of modified H-shape in cross-section, with opposed central splines 19 extending longitudinally along the arms 20a, 20b and 20c from near the bases or bottoms 21 of the slots, (see FIG. 4), to points slightly short of the outer ends thereof, as will be later explained herein.

The drive elements on which the jaws 16 are mounted comprise a pinion shaft 22, a pinion-gear shaft 23, and a gear shaft 24 in the slots 18 of the respective arms 20c, 20a and 20b. Such shafts have left hand threaded worm sections 25a on the pinion shaft 22 and gear shaft 24, and a right hand threaded worm section 25b on the pinion-gear shaft 23, as will be hereinbelow described. The outer end portions 26 of the shafts are of reduced diameter and extend through bores 27 in slot closure or assembly bearing plates 28 mounted across the ends 29 of the arms by cap screws 30. The outer end 31 of each shaft is of non-circular cross-section, such as of square cross-section, to receive a wrench thereon.

Spaces or grooves 32 are formed in the body 15 to extend between the slot base 21 and a central recess 33 formed in the rear face of the body 15, such recess being three sided or concentric with or parallel to the outer sides 17a, 17b, 17c of the body 15. The gear box, which has been described, as shown in FIG. 4, to space the body from the base plate 12, is comprised of assembled bearing plates 35 with outwardly turned edges 36. The gear box 34, as mounted in the recess 33 to extend rearwardly therefrom, is shown in FIGS. 3, 5 and 6 as closed by a rear closure or cover plate 45. The gear box plates 35 are assembled by means of cap screws or machine screws 37 in the opposed or mated edges 36 of the plates 35, alternate edges being recessed for the heads of the cap screws 37 to shoulder therein. As indicated in FIG. 4, the plates 35 have bores 38 centrally therethrough through which pass the shafts 22, 23 and 24, and such bores may best receive anti-friction units 39 therein to supply journals for the shafts, as indicated for the pinion shaft 25a, as best shown in FIG. 4.

A pinion 40 is mounted on the inner end of the shaft 25a to mesh with a pinion 41a comprising the inner element of a pinion-gear 41. The gear 41b of such double meshed element 41 meshes in turn with the gear 42 on the inner end of the shaft 24. It can thus be seen that if a wrench is placed on the non-circular end 31 of any one of the shafts and rotated in one direction the gears 42, 41b will be driven oppositely as regards clockwise or counter-clockwise directions. Also, the pinion 41a on the shaft 23 inwardly of the gear 41b, with which it is integrally formed, must rotate in the same direction as the gear 41b, while the pinion 40 on the shaft 22 will rotate in opposite hand from the pinion 41a with which it meshes. Thus it can be seen that any one of the shaft ends 31 may have a wrench applied thereto and when rotated in one direction the worm portions 25a, 25b and 25c will rotate to move the jaws 16 in the respective slots 18 in the same radial direction. Conversely, rotation of any shaft end 31 in the opposite direction will cause the chucks 16 to be moved on their respective worms 25a, 25b and 25c, in the opposite radial direction.

As a feature of construction, it should be noted that the slot axes are equally, angularly spaced apart, and that the distances between the imaginary center within the recess 33 at which the shaft axes intersect, and the shoulders at the outer ends of the respective worm portions 25b and 25a are equal. Also such distance is so predetermined that the shaft shoulders may rotate with slightest friction against the inner faces of the assembly plates 28 or otherwise such shoulders may be so spaced that they just barely clear the inner surfaces of the plates 28 when they are assembled on the end of the arms 20a, 20b and 20c.

The jaws 18, as hereinabove described, travel together in adjustment in infinitesimal degrees, either inwardly or outwardly, and also the jaws are uniformly constructed in stepped surfaces 43, 44 and 46, with each surface from the inner rest surface 43, being farther out radially and extending farther forwardly, as can be seen in FIGS. 1, 3, 5 and 6, with the outermost step 46 therefore being the farthest forwardly. Thus with the jaws 16 at any one position, three diameters of work can be welded or otherwise worked upon without having to move the jaws 16.

As shown in FIGS. 7 and 8 a variation or modification of chuck jaw transmission has its shaft 50' disclosed in which an idler bevel gear 50 is mounted in a bore 51 through a spacer plate 45' against which bear the assembled bearing plates 35 comprising the gear box 34'. The spacer plate 45' may then be concentrically counterbored to receive an anti-friction unit 52 and a retaining collar 53 which is connected by a pin 54 to the outer end of the idler bevel gear shaft 50'. From the slots 18 transmission shafts 55a, 55b and 55c extend each through respective gear box plates 35 and such shafts terminate in bevel gears 56a, 56b and 56c, respectively, which mesh with the idler gear 50. Thus, regardless of which non-circular upper shaft end is turned, each of the shafts will be driven in the same direction whereby the jaws must consequently move in the same direction.

Another preferred modification of the invention is shown in FIGS. 9 and 10 in which the end plates shown in the first form of the invention, FIGS. 1–6, inclusive, are exchanged for special end cap assemblies 60. Each assembly 60 includes a bearing unit housing 61 which seats across the outer faces of the two opposed arm segments comprising the arms 20a, 20b and 20c. Such bearing unit housing 61 has therein a bore and two concentric counterbores outwardly thereof. The upper ends of shafts 62 which operate the chuck jaws are turned down to provide a part 63 which passes through a bearing unit, as a roller or ball bearing unit 64, such unit having a hub 65 to seat upon the inner counterbore while the inner race of the unit 64 extends with slight clearance within the outer counterbore.

As is conventional, the inner race of the bearing unit 64 is press-fitted on the shaft part 63 whereas the outer race of the ball bearing unit 64 is press-fitted into the aforesaid outer counterbore. The outer portion of the shaft part 63 is threaded to receive a nut 66 thereon, which, when threaded full up, shoulders tightly on top of the upper race of the bearing unit 64 to restrain the outer race in assembly.

A closure plate or cap 67 seats on top of the bearing unit housing 61. A bore 68 and counterbore 69 are provided in the cap 67 to receive therethrough the turned down shaft portion 70 and to seat over the nut 66. As in the cases hereinabove described the outer ends of the shafts 62 terminate in non-circular ends 31' such as of hexagonal construction. Thus a wrench, as a socket head wrench, can be fitted over any end to rotate a shaft 62, and thereby rotate together all gears. Assembly is completed by bolts 71 which pass through the cap 67 and the housing 61 and make threaded engagement in tapped holes in the upper end faces of the arm segments. This change of construction accomplishes the purpose of placing anti-friction or bearing elements outwardly where they are easily accessible. Also they tie together the opposed arm segments providing the slots so that these segments may not be sprung apart readily. Also these elements close the ends of the slots so that foreign matter cannot enter the slots except from the front of the chuck above the jaws 16.

The invention considers a chuck having jaws which are moved conjointly by rotating one shaft on which a chuck jaw is mounted, adjustment thus being obtained in infinitesimal gradients, while the jaws provide cooperative stepped surfaces to permit work in several stepped diameters at each position. Also the invention considers universal adjustment of two part jaws which are universally connected.

The invention is thus not limited to the structures shown and/or described in the herein specification, but other structures are included as long as such may fall within the broad spirit of the invention and within the broad scope of interpretation claimed for and merited by the appended claims.

What is claimed is:

1. A three jaw chuck comprising a three sided body with an arm extending outwardly from each corner thereof with the axis of said arms extending radially from the center of a circle circumscribed within said sides, each arm providing a slot axially extending therein and of modified H-shape in cross-section, a jaw of cross-section to ride slidably in each slot and extending forwardly in stepped succession to provide a plurality of work contacting surfaces transverse to the respective arm axis with the most forward surface outermost, said body providing a central inner recess concentric with the sides thereof and a gear box in said recess and extending rearwardly therefrom to space said body from a backing plate provided for said chuck, said gear box comprising three centrally bored plates concentric with said recess with corners adjoined in assembly, drive elements comprising a pinion shaft, a pinion-gear shaft, and a gear shaft disposed with pinions and gears meshed within said gear box, with one of said shafts extending through each respective gear box bearing plate and threadedly extending through the chuck jaw in the respective slot outwardly thereof, the outer end portions of said shafts terminating in non-circular outer ends, and said chuck including centrally bored slot end assemblies mounted upon the outer end of each arm to extend across the slot therein, the outer portion of each shaft extending outwardly through the slot end assembly therefor, said pinion-gear and its jaw having one hand of threads and said pinion and said gear and their respective jaws having the other hand of threads, whereby upon one of non-circular shaft ends being contacted to rotate it and the drive element thereon, the other meshed drive elements are rotated thereby to move said jaws uniformly inwardly and outwardly dependent upon the hand of rotation, whereby said stepped surfaces may selectively grasp work to be welded.

2. A chuck as claimed in claim 1 in which said body is grooved between the bottom of each slot and said gear box recess to receive a shaft therein.

3. A three jaw chuck comprising a three sided body with an arm extending outwardly from each corner thereof with the axis of said arms extending radially from the center of a circle circumscribed within said sides, each arm providing a slot axially extending therein and of modified H-shaped cross-section, a jaw of cross-section to ride slidably in each slot and extending forwardly in stepped succession to provide a plurality of work contacting surfaces transverse to the respective arm axis with the most forward surface outermost, said body providing a central inner recess concentric with the sides thereof and a gear box in said recess and extending rearwardly therefrom to space said body from a backing plate provided for said chuck, said gear box comprising three centrally bored plates concentric with said recess with corners adjoined in assembly, a transmission for said jaws including said shafts extending through each respective gear box plate and threadedly extending through the chuck jaw in the respective slot outwardly thereof, the outer end portions of said shafts terminating in non-circular outer ends, said transmission comprising gear means in said gear box including gear means on each of said shafts and said gear means being adapted to mesh said shaft mounted gear means to rotate in direction to move said chuck jaws in the same direction inwardly and outwardly and said chuck including centrally bored slot end closure means mounted upon the outer end of each arm to extend across the slot therein, the outer portion of each shaft extending outwardly through the slot end closure means therefor, one of the non-circular shaft ends being selectively rotated whereby to rotate the meshed drive elements to move said jaws uniformly inwardly and outwardly dependent upon the hand of rotation, and said stepped surfaces thereby being positioned to selectively grasp work to be welded.

4. A chuck as claimed in claim 3 in which said body is grooved between the bottom of each slot and said central inner recess to receive a shaft therein.

5. A three jaw chuck comprising a three sided body with an arm extending outwardly from each corner thereof with the axis of said arms extending radially from the center of a circle circumscribed within said sides, each arm providing a slot axially extending therein and of modified H-shaped cross-section, a jaw of cross-section to ride slidably in each slot and extending forwardly in stepped succession to provide a plurality of work contacting surfaces transverse to the respective arm axis with the most forward surface outermost, said body providing a central inner recess concentric with the sides thereof and a gear box in said recess and extending rearwardly therefrom to space said body from a backing plate provided for said chuck, said gear box comprising three centrally bored plates concentric with said recess with corners adjoined in assembly, a transmission for said jaws including three shafts each mounting a gear on the inner end thereof, each of said three shafts extending from the respective gear mounted on its inner end outwardly extending through each respective gear box plate and threadedly extending through the chuck jaw in the respective slot outwardly thereof, the outer end portions of said three shafts terminating in non-circular outer ends, said transmission additionally including an idler gear in said gear box mounted to mesh with each of said shaft mounted gears to rotate in direction to move said chuck jaws in the same direction inwardly and outwardly and said chuck including a centrally bored bearing unit assembly mounted upon the outer end of each arm to extend across the slot therein, the outer portion of each shaft extending outwardly through said bearing unit so that a respective non-circular outer end may be selectively manually rotated to rotate the respective gear on the inner end of the respective shaft to rotate said idler gear and the other two shaft inner end mounted gears thereby to move said jaws uniformly inwardly and outwardly dependent upon the hand of rotation, this to bring said stepped surfaces selectively in position to grasp work to be welded.

References Cited by the Examiner

UNITED STATES PATENTS

| 377,596 | 2/1888 | Baville | 279—113 |
| 2,225,273 | 12/1940 | Jacobs | 279—112 |
| 2,515,216 | 7/1950 | Guelph | 279—113 |

FOREIGN PATENTS

| 845,017 | 7/1952 | Germany. |

LESTER M. SWINGLE, *Primary Examiner*.

ROBERT C. RIORDON, *Examiner*.

H. V. STAHLHUTH, *Assistant Examiner*.